United States Patent [19]

Curatolo et al.

[11] Patent Number: 4,556,697

[45] Date of Patent: Dec. 3, 1985

[54] ALTERNATING COPOLYAMIDE PREPARED ON A POLYMER MATRIX

[75] Inventors: Benedict S. Curatolo, Maple Heights; Gerald P. Coffey, Lyndhurst, both of Ohio

[73] Assignee: The Standard Oil Company, Cleveland, Ohio

[21] Appl. No.: 517,163

[22] Filed: Jul. 25, 1983

[51] Int. Cl.$^4$ .............................................. C08G 69/28
[52] U.S. Cl. .................................. 525/434; 525/180; 525/182; 525/436; 525/426; 528/310; 528/328; 528/329.1; 528/331; 528/336; 528/352; 528/353
[58] Field of Search ............... 528/353, 352, 331, 310, 528/328, 329, 336; 525/430, 434, 436, 180, 182, 419, 420, 426

[56] References Cited

U.S. PATENT DOCUMENTS

| | | | |
|---|---|---|---|
| 4,118,374 | 10/1978 | Yamazaki et al. | 528/337 |
| 4,231,913 | 11/1980 | Kyritsos et al. | 528/329 |
| 4,429,109 | 1/1984 | Curatolo et al. | 528/331 |

OTHER PUBLICATIONS

The Condensed Chemical Dictionary, Eighth Edition, p. 28.
Hackh's Chemical Dictionary, Fourth Edition, p. 27.
Higashi et al., *Journal of Polymer Science*, Polymer Chemistry Edition, vol. 18, pp. 851–856, 1099–1104, John Wiley & Sons, 1980.
Preston et al., Journal of Polymer Science, Polymer, pp. 13–27, John Wiley and Sons, 1978.

*Primary Examiner*—Harold D. Anderson
*Attorney, Agent, or Firm*—David P. Yusko; John E. Miller, Jr.; Larry W. Evans

[57] ABSTRACT

Nylon-type polyamides are produced by the polycondensation of a non-wholly aromatic diacid and diamine in the presence of a poly(ethylene oxide) matrix.

10 Claims, No Drawings

ALTERNATING COPOLYAMIDE PREPARED ON A POLYMER MATRIX

BACKGROUND OF THE INVENTION

1. Field of the Invention

This invention relates to polymers containing amide linkages and to a process for preparing such polymers. More specifically this invention relates to the preparation of non-wholly aromatic polyamides in the presence of poly(ethylene oxide) matrix by the condensation polymerization of a dicarboxylic acid diamide derivatives of terephthalic acid and a diamine. In part, the invention relates to the preparation of nylon-3/X copolymers of increased molecular weight.

2. Description of the Prior Art

Nylon is a generic term applied to synthetic polyamides that have fiber, film or plastic-forming properties. All nylons have in their polymer chain the amide group:

  (I)

which is the link that joins the repeating hydrocarbon units of various lengths. Polyamides are generally formed by condensation polymerization or by addition polymerization. The parameters for these processes as well as the specific monomers suitable for polyamide formation are known to those skilled in the art.

In part the present invention pertains to nylon-3/X polymers which contain nylon-3 units. This form of shorthand is used to identify the number of carbon atoms in the respective monomers which make up the polyamide. Nylon-3 is a polyamide comprised of monomers with 3 carbons. Nylon 3/X is a copolyamide which contains groups of 3 carbons along with any nylon fragment of the general formula:

  (II)

or

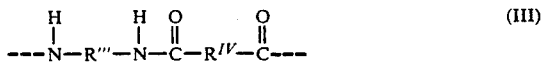  (III)

where R'', R''' and $R^{IV}$ are any aliphatic, alicyclic, or aromatic carbon group.

It is known that nylon-3 can be prepared from various monomers. For example, U.S. Pat. No. 4,283,524 describes a process where nylon-3 is prepared from the ammonium salts of alpha,beta-unsaturated monocarboxylic acids. U.S. Pat. No. 2,691,643 teaches that nylon-3 can be prepared by the thermal condensation of beta-amino propionic acid. U.S. Pat. Nos. 3,629,203 and 3,499,879 relate to the preparation of nylon-3 by the condensation reaction of acrylonitrile. U.S. Pat. No. 2,749,331 teaches that nylon-3 can be prepared from acrylamide. However, nylon-3 polymers and copolymers produced by these processes are generally characterized by very low molecular weight.

In part the instant invention pertains to the production of polyamides in the presence of a polymer matrix. A matrix is a high molecular weight polymer which acts as a site for polymerization by increasing the local concentration of the reactants. Wholly aromatic polyamides have been prepared using triphenyl phosphite in the presence of a poly(4-vinylpyridine) matrix or a poly(ethylene oxide) matrix, Higashi et al., *Journal of Polymer Science*, Polymer Chemistry Edition, Volume 18, pages 851–856, 1099–1104, John Wiley and Sons, Inc., 1980.

An object of the instant invention is to extend the concept of matrix polymerization to systems which are not wholly aromatic. It is a further object of the present invention to produce nylon-3/X copolymers of increased molecular weight.

SUMMARY OF THE INVENTION

A process for producing nylon type polyamides by polymerizing a dicarboxylic acid diamide derivative of terephthalic acid and a diamine in the presence of a polymer matrix.

DETAILED DESCRIPTION OF THE INVENTION

The Monomers

The dicarboxylic acid diamide derivatives of terephthalic acid suitable for this invention are of the general formula:

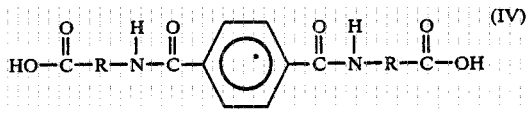  (IV)

where each R is independently a $C_2$ to $C_{12}$ divalent aliphatic, alicyclic or aromatic radical. Preferably each R is independently a $C_2$–$C_{12}$ alkyl radical. Most preferably each R is —($CH_2CH_2$)— and the resulting compound is N,N'-terephthaloyldi-beta-alanine. This later embodiment contains the nylon-3 moiety, and yields the preferred products of the instant invention, i.e. nylon-3/X copolymers. These diacids can be synthesized by the straight forward reaction of terephthaloyl chloride and omega-amino acids containing 2 to 12 carbon atoms in a dilute NaOH solution.

The diamines suitable for this invention are of the formula:

  (IV)

where R' is any aliphatic, alicyclic or aromatic divalent radical and may be branched or unbranched and may contain one or more hetero atoms. When R' is an aliphatic radical, R' is preferably a $C_2$ to $C_{12}$ alkyl radical. When R' is an aromatic radical, preferably R' is one of

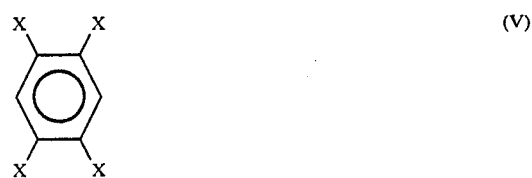  (V)

or

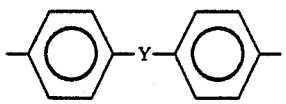

where each X is independently one of hydrogen, a $C_1$ to $C_4$ alkyl group or a halogen and Y is one of $CH_2$, S, O, or $SO_2$. When R' is an alicyclic radical, preferably R' is one of

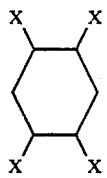

and

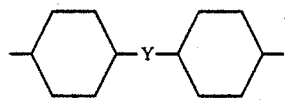

where X and Y are as previously defined.

Representative of the diamines suitable for the instant invention are hexamethylenediamine, 4,4'-sulfonyldianiline, 4,4'-methylenedianiline, 4,4'-thiodianiline, 2,3,5,6-tetramethyl-p-phenylene-diamine, 4,4'-oxydianiline, and polyoxypropylene diamines such as diamines of the formula

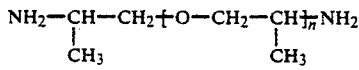

where n is 2.6 (i.e. Jeffamine ® D-230), 5.6 (i.e. Jeffamine ® D-400) or 33 (i.e. Jeffamine ® D-2000). These latter polymeric diamines are products of the Texaco Chemical Corporation.

The Process

Equimolar amounts of the diacid and the diamine polycondense to form a nylon type polyamide in the presence of a polymer matrix. Typically this reaction takes place in a suitable solvent in the presence of a catalyst. LiCl may be optionally added to enhance the solubility of the reactants in the solvent.

The polymer matrix is a high molecular weight polymer which serves as an activator for the condensation polymerization by adsorbing the reactants onto the backbone of the polymer thereby providing a site where increased concentrations of the diacid and diamine readily react. Typically the polymer matrix has a molecular weight of at least 1000 with higher molecular weights of about 300,000 being preferred. The amount of the polymer matrix employed is not a critical feature of the invention. Typically the amount of the polymer matrix employed is between 1 and 10 weight percent based on the weight of the diacid and diamine reactants and more preferably about 5 wt. percent. The preferred polymer matrix is poly(ethylene oxide) or blends thereof. It is anticipated that other polymers are also suitable for the instant invention, particularly poly(4-vinylpyridine) and polyvinylpyrrolidone.

Representative of suitable solvents for the polycondensation reaction are N-methylpyrrolidone, pyridine, dimethyl acetamide, dimethyl formamide and hexamethyl phosphoramide and mixtures thereof. The preferred solvent is a mixture of N-methylpyrrolidone and pyridine.

The preferred catalyst for the instant invention is triphenyl phosphite. However it is anticipated that other polycondensation catalysts, particularly phosphorous containing catalysts can also be employed.

The instant process can be conducted at temperatures ranging from room temperature to the boiling temperature of the solvent. Typically the reaction temperature will be between about 80° C. and 150° C. Preferably the reaction temperature is between about 100° C. and 130° C. and more preferably about 120° C.

The instant reaction is conducted at atmospheric or greater pressures in a substantial absence of oxygen in the presence of an inert gas. Water is a product of the instant reaction and it appears that water removal is not necessary for small scale reactions. However it is anticipated that in large scale operations, water removal will be preferred.

This polycondensation process can proceed by any of the generally known modes of polymerization including slurry, suspension or solution polymerization by batch, continuous or intermittent addition of the monomers or other components. Solution polymerization is preferred.

The Polyamides

The instant invention succeeds in producing non-wholly aromatic polyamides in the presence of a polymer matrix. The dicarboxylic acid diamide derivatives of terephthalic acid and an aliphatic diamine react to form a polyamide of the following formula

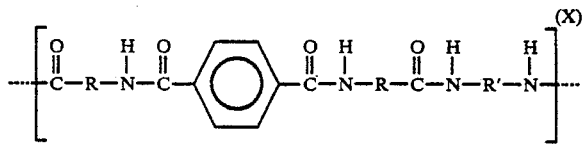

where R and R' are as previously defined.

These polyamides have an alternating ABAB type structure, where A is the portion contributed by the diacid and B is the portion contributed by the diamine. This alternating structure is due to the difunctional carboxylic acid monomer which will not homopolymerize. These polyamides will also exhibit a wide range of physical properties depending upon the choice of monomers.

The polyamides of the instant invention have a wide variety of applications. Generally they may be used in any application calling for a nylon type polymer. For example these polyamides can be used as fibers, plastic films and resins.

Of particular interest are the nylon 3/X polymers achieved when N,N'-terephthaloyldi-beta-alanine is the diacid monomer. Nylon-3 polymers are capable of being spun into cotton-like fibers, but because the nylon-3 polymers thus far produced are characterized by insufficient molecular weight and chain length, it is not economically feasible to do so on a large scale. Nylon-3/X polymers formed in the presence of a polymer matrix exhibit increased molecular weight and contain at least 50 mole percent nylon-3 units. Additionally because of the hydrophobic aromatic ring in the copolymer, excessive water uptake of a resulting fiber is reduced. Consequently polyamide fibers produced from N,N'-terephthaloyldi-beta-alanine and a diamine are anticipated to exhibit excellent utility in comfort fiber applications.

SPECIFIC EMBODIMENTS

In order to illustrate the instant invention, the several examples are shown in Table I.

In each example, N,N'-Terephthaloyldi-beta-alanine (0.02 moles) and an equimolar amount of diamine or combination of diamines were reacted to form high molecular weight alternating copolyamides in the presence of 0.044 moles of triphenyl phosphite and 5.0 weight percent of poly(ethylene oxide) based on the weight of the diacid and diamine reactants. The poly(ethylene oxide) matrix had a molecular weight of 300,000.

Reactions were carried out in a solution of 60 ml N-methylpyrrolidone (NMP) and 40 ml pyridine which contained 6.0 grams of lithium chloride to enhance solubility. The solution was heated for 2 hours at 100°-120° C. in a 250-ml round-bottomed 3-necked flask fitted with a thermometer and a water-cooled reflux condenser and immersed in an oil bath. The solution was covered with a nitrogen blanket and stirred with a magnetic spin-bar.

The polymeric products were precipitated in boiling methanol and washed several times, successively, in boiling methanol and boiling water, followed by filtration using a Buchner funnel. The polyamide yields were approximately 85-90 percent of water-insoluble and methanol-insoluble material.

Each of the polymers produced were subjected to infrared spectroscopy and nuclear magnetic resonance spectroscopy in order to confirm the formation of a polyamide. Intrinsic viscosities were determined for the polyamides by dissolving the polyamide in $H_2SO_4$ to make about 1 g polyamide per 100 ml $H_2SO_4$ solution. Viscosity was measured via a Cannon-Ubbelohde dilution viscometer mounted in a constant temperature bath and maintained at 25° C. Percent crystallinity was determined by x-ray diffraction. Melting points for the polyamides were determined by Differential Scanning Calorimetry.

TABLE I

Polymers from the Reaction of N,N'-Terephthaloyldi-Beta-Alanine With Various Diamines on a Poly(ethylene oxide) Matrix

| Example | Diamine | Intrinsic Viscosity | Percent Crystallinity | Melting Point (°C.) |
|---|---|---|---|---|
| 1 | Hexamethylenediamine | 0.14 | 36.8% | 307 |
| 2 | 4,4'-Sulfonyldianiline | 0.44 | 19.7% | N/A |
| 3 | 4,4'-Methylenedianiline | 0.79 | 17.2% | 352 |
| 4 | 4,4'-Thiodianiline | 0.54 | 8.8% | 358 |
| 5 | 2,3,5,6-Tetramethyl-p-phenylene-diamine | 0.51 | 21.2% | 373 |
| 6 | 4,4'-Oxydianiline | 0.63 | 13.1% | 362 |
| 7 | 90% -4,4'-Methylene-dianiline and 10% Jeffamine ® D-400 | 0.41 | 12.7% | 358 |
| 8 | 80% -4,4'-Methylene-dianiline and 20% Jeffamine ® D-2000 | 0.15 | 14.8% | 360 |

Although the invention is described in considerable detail by the above examples, these examples are for the purposes of illustration only and it is understood that variations and modifications can be made without departing from the spirit and scope of the invention.

The claimed invention is:

1. A process for producing a nylon-type polyamide comprising contacting a non-wholly aromatic dicarboxylic acid diamide derivative of terephthalic acid of the formula:

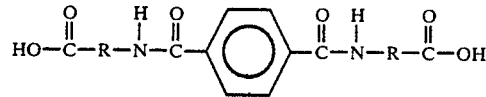

and a diamine of the formula

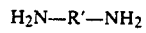

where each R is independently an aliphatic or alicyclic divalent radical and R' is an aliphatic or alicyclic divalent radical, in contact with a polymer matrix and a polycondensation catalyst.

2. The process of claim 1, where R is a $C_2$ to $C_{12}$ divalent aliphatic radical.

3. The process of claim 2, where R is —$(CH_2—CH_2)$—.

4. The process of claim 1, where R' is a $C_2$ to $C_{12}$ divalent aliphatic radical.

5. The process of claim 1, where R' is selected from the group consisting of

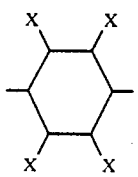

and

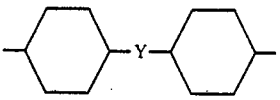

where each X is independently one of hydrogen, a $C_1$ to $C_4$ alkyl group or a halogen and Y is one of $CH_2$, S, O or $SO_2$.

6. The process of claim 1, where R' is of the structure

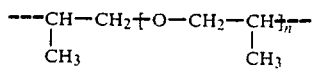

where n is 2.6, 5.6 or 33.

7. The process of claim 1, where the polymer matrix is selected from the group consisting of poly(ethylene oxide), poly(4-vinylpyridine) and polyvinylpyrrolidone.

8. The process of claim 7, where the polymer matrix is poly(ethylene oxide).

9. The process of claim 1, where the polycondensation catalyst contains phosphorous.

10. The process of claim 9, where the polycondensation catalyst is triphenyl phosphite.

* * * * *